United States Patent [19]
Flagg

[11] 3,792,868
[45] Feb. 19, 1974

[54] CHUCK

[76] Inventor: Richard Edward Flagg, 682 Winter St., East Bridgewater, Mass. 02333

[22] Filed: Apr. 3, 1972

[21] Appl. No.: 240,435

[52] U.S. Cl............................ 279/2, 242/72, 82/44
[51] Int. Cl...................... B65h 75/02, B23b 31/40
[58] Field of Search. 279/2; 242/72, 46.4; 269/48.1; 82/44

[56] References Cited
UNITED STATES PATENTS
2,211,471  8/1940  Klein.................................. 242/72
168,849  10/1875  Sirret................................... 242/72

FOREIGN PATENTS OR APPLICATIONS
262,608  7/1949  Switzerland............................ 279/2
118,085  10/1918  Great Britain......................... 279/2
697,837  9/1940  Germany............................. 242/72

*Primary Examiner*—Andrew R. Juhasz
*Assistant Examiner*—Z. R. Bilinsky

[57] ABSTRACT

A chuck for internally gripping a hollow member comprising an interior member having a longitudinal axis and including a plurality of generally planar exterior surfaces each parallel to the axis; a plurality of rollers, each roller parallel to and in contact with one of those surfaces; a plurality of jaw members, each having an arcuate interior surface in contact with at least one of the rollers; and means for resiliently maintaining the jaw members in contact with the rollers.

2 Claims, 3 Drawing Figures

PATENTED FEB 19 1974 3,792,868

CHUCK

This invention relates to improvements in chucks suitable for internally gripping a hollow member.

While there have been a number of chucks designed for use in a process where, for example, a roll of material must be locked to a supporting shaft or to machine arms, previous designs have suffered from one or more of a number of drawbacks: expensive to manufacture, difficult to maintain or service, non-automatic operation, operative only in one direction, short chuck lifetime, etc.

It is a principal object of the present invention to provide an improved chuck which is automatic in operation and inexpensive to manufacture.

Further objects include the provision of a chuck which is operative irrespective of the sense of rotation of the member to be gripped, which is useable on existing roll-supporting shafts (rather than requiring its own specifically designed shaft), which is easily disassembled and reassembled, and which is of improved design so as to reduce wear on chuck components and to achieve ease engagement and disengagement of the chuck jaws with the member to be gripped.

To achieve these and other objects as will further appear, a chuck constructed according to the invention for internally gripping a hollow member comprises an interior member which has a longitudinal axis and which includes a plurality of generally planar exterior surfaces which are parallel to the axis. A plurality of rollers are provided, each roller being oriented parallel to, and in contact with, one of the exterior surfaces of the interior member. A plurality of jaw members are provided radially outwardly from the rollers. Each jaw member has an arcuate interior surface in contact with at least one of the rollers. Means are provided for resiliently maintaining the jaw members in contact with the rollers. In preferred embodiments of the invention there are a predetermined even number of such surfaces on the interior member and a single roller is in contact with each of those surfaces. There are also exactly one half as many jaw members as such surfaces and each jaw member is in contact with two of the rollers.

It is also preferred that the chuck incorporate roller-retaining means in the form of a pair of rings disposed about opposite longitudinal ends of the interior member, each ring having a plurality of recesses with each recess receiving the end of one of the rollers. To prevent excessive radial movement of the rollers, the recesses have a smaller area at the radially outermost surface of the ring than at other radial portions of the ring.

Preferably, each jaw member is provided with a plurality of core-gripping formations on its outer surface as well as a plurality of circumferential grooves in the outer surface. Resilient bands disposed in those grooves resiliently maintain the jaw members in contact with the rollers.

Other objects, features, and advantages of the invention will appear from the following description of a particular preferred embodiment, taken together with the accompanying drawing.

Figure 2:
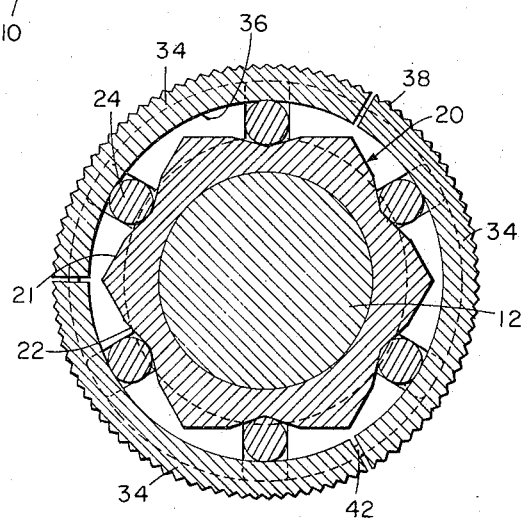
FIG. 2 is a sectional view taken at 2—2 of FIG. 1.

Referring to the drawing, the chuck 10 is rigidly maintained at a predetermined position on a conventional roll-supporting shaft 12 by means of a plurality of set screws 14 which extend through outer end rings 16 and through cylindrical end portions 18 of interior member 20. In the preferred form illustrated, the cross-sectional exterior shape of the portion of interior member 20 between cylindrical end portions 18 is a hexagon having six planar exterior surfaces 21 each parallel to the axis of member 20. Slight, longitudinally disposed depressions 22 are provided in the center of each face 21 (best seen in FIG. 2). The depressions 22 are preferably V-shaped in section. Although the dimensions of depressions 22 may vary substantially and still achieve the benefits described below, typically for a 3 inch O.D. chuck they have a depth of about 0.020 inch and a width extending about one-half the distance across each face 21.

Figure 1:
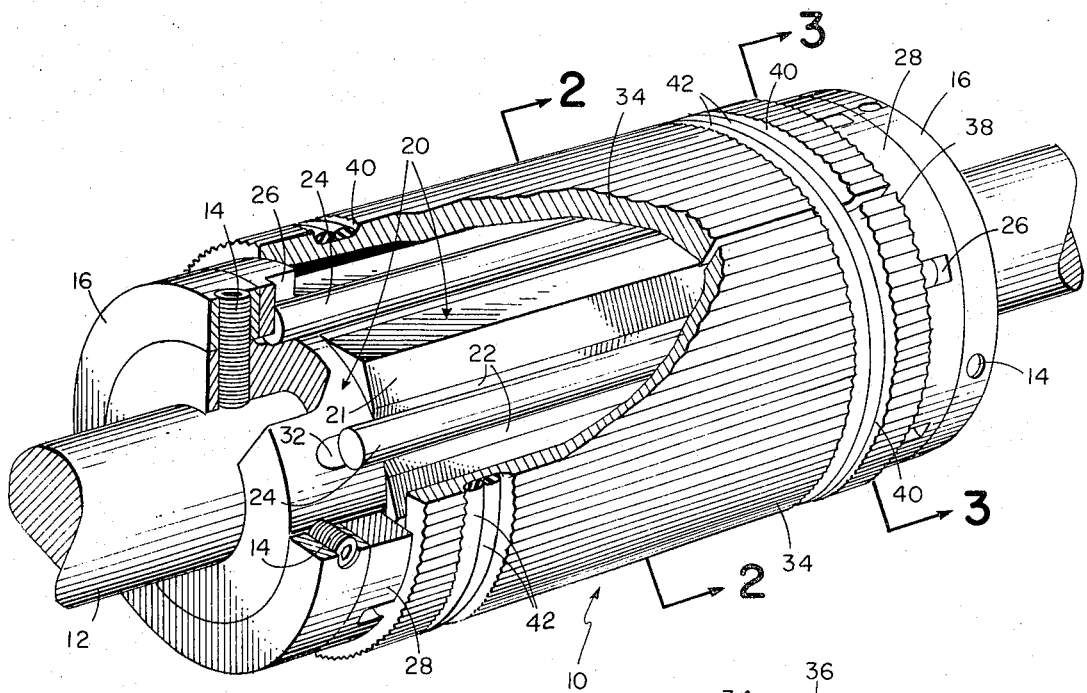
FIG. 1 is a partially broken away perspective view of a chuck constructed according to the invention.
Figure 3:
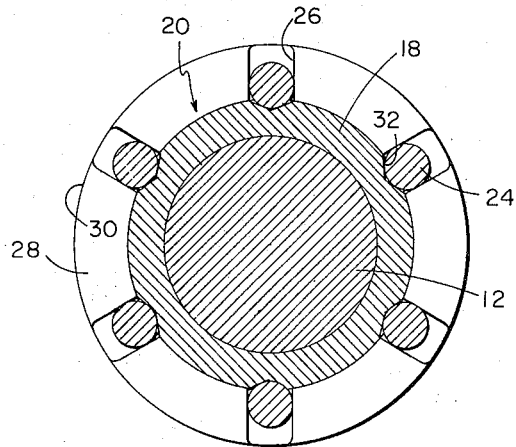
FIG. 3 is a sectional view taken at 3—3 of FIG. 1.

A roller 24 is disposed on each face 21 of the hexagon. Each roller extends beyond the longitudinally opposed ends of the hexagonal portion of member 20 to partially overlie the cylindrical end portions 18. The ends of each roller are disposed in recesses 26 in roller-retaining rings 28 which are disposed about cylindrical portions 18 interior of end rings 16. As best seen in FIG. 3, each recess 26 has a smaller area at the radially outermost surface 30 of the roller-retaining ring 28. The grooves 32 are cut into the exterior surface of cylindrical portions 18 of the interior member 20 to assure that the rollers 24 are in contact with the hexagonal portion of the member 20.

The surfaces 36, 21 and/or the surfaces of rollers 24 may be roughened or of differing textures to assure the rollers 24 will indeed roll, and not slide, on surfaces 36 and 21.

Jaw members 34 are disposed around the rollers 24. Each of the three jaw members 34 has an arcuate inner surface 36 which is in contact with two neighboring rollers 24. Formations in the form of grooves 38 in the exterior surfaces of jaw members 34 are provided to improve the gripping of the internal surface of the tubular core or other member to be gripped (not shown). Longitudinally aligned, circumferential grooves 40 are provided in the outer surface of each of the jaw members 34. Resilient bands 42 are disposed in the grooves 40.

In operation, the chuck 10 is placed on shaft 12 and secured thereto by tightening set screws 14. A conventional roll collar (not shown) is fixed to the shaft near one end thereof. The shaft 12 and chuck 10 are then inserted within the tubular core (not shown) to be gripped until the core abuts the collar (thus positioning the core axially). A second collar is fixed to the shaft to abut the other end of the core. A braking or motive force may be applied to the core (and the roll of material wound thereabout) from the shaft 12 through the chuck 10 as follows. With the shaft 12 and chuck 10 inserted into the tubular core, the weight of the core (and any material wound thereon) will bear upon the jaw member(s) 34 which happen to be facing upward on the top side of the chuck 10. Any relative rotation between the core and the shaft 12 will cause a relative rotation of the jaw members 34 with respect to the interior member 20 since the latter is secured to the shaft 12 by set screws 14 and since frictional engagement of the uppermost jaw member(s) with the core causes the jaw members (linked by bands 42) to assume the motion of the core. The rollers 24, in contact with both interior member 20 and a jaw member 34, roll on the relatively moving surfaces 21, 36 toward an apex of the hexagon. Since the rollers are hard and substantially incompressible, as they roll into the regions of the apexes of the hexagon (where the separation of surfaces 21 and 36 was less than the diameter of the rollers) they force the resiliently restrained jaw members radially outward against the resistance of the elastic bands 42 thus forcing the grooves 38 to grip the core. The roller-retaining rings 28 assure the simultaneous circumferential displacement of all rollers 24 and the consequent simultaneous raidal movement of all jaw members 34 so as to uniformly and securely grip the inner surface of the tubular core.

The arcuate shape of jaw member surfaces 36 and the disposition of the faces 21 produce a greater radial movement of the jaw members (and consequent greater gripping of the tubular core) as a greater rotational displacement of jaw members 34 and interior member 20 is produced. Owing to the rolling friction between rollers 24 and both surfaces 36 and surfaces 21, however, there is almost no wear on the parts of the chuck despite the tremendous forces which are involved when a very heavy roll of material is wound on the particular tubular core. The use of rollers also provides for continuous adjustment of the gripping force with changes in force applied to the shaft or tubular core. Furthermore, when the forces causing the rotational displacement of the shaft 12 and the tubular core are withdrawn, the rollers are free to roll back to their neutral (i.e., central) positions on the faces 21. The depressions 22 aid in this return of the rollers to the position shown in FIG. 2. The depressions also increase the total incremental expansion of the jaws from their neutral or retracted positions to their fully extended positions, thereby giving more expansion so as to be useable with cores of a range of diameters.

The radial dimension of roller-retaining rings 28 is chosen (for rollers 24 of a given diameter) such that the reduced area portions of the recesses 26 are less than a roller diameter (measured radially) from the apexes formed by the intersection of adjacent faces 21. This construction assures that the rollers 24 cannot pass over the apexes and onto the neighboring face 21 even if the enormous forces involved (and/or the softness of the core material) might have forced the jaw members radially outward enough for that to happen. (For a radially thicker ring 28, the recesses 26 may not open into surface 30 but would terminate interior of surface 30 at an appropriate depth to achieve the desired limitation on radial movement of rollers 24.)

While the operation of the preferred embodiment of a chuck constructed according to the invention has been described as used with a conventional roll-supporting shaft (i.e., shaft 12), it will be apparent to those skilled in the art that numerous other environments for use of the chuck are possible (e.g., a number of chucks on a single shaft 12; a custom built shaft in which the planar faces 21 are integral with the remainder of the shaft; a pair of chucks engaging the tubular core at its ends and themselves attached to machine arms or a turret; etc.). It will also be apparent to those skilled in the art that numerous other embodiments are within the scope of the invention and the following claims.

What is claimed is:

1. A torque transmitting chuck for internally gripping a hollow member and interconnecting said hollow member with a second member maintained at a relative torque with respect to said hollow member, the chuck comprising an interior member securable to said second member for rotation therewith and having a longitudinal axis and including a plurality of generally planar exterior surfaces each parallel to said axis, the exterior shape of said interior member in its axially central region in a cross-section taken perpendicular to said longitudinal axis being a regular polygon, a plurality of exterior jaw members for gripping said hollow member thereby to maintain a relative torque between said interior member and said jaw member, each jaw member having an arcuate interior surface, the number of jaw members being no more than one-half the number of sides of said polygon, means disposed between said interior member and said jaw members including elements which contact at least one of the group consisting of said interior member and said jaw members, all said elements which so contact at least one of said group being disposed for only rolling contact therewith and comprising a plurality of rollers, each roller parallel to and in contact with both one of said generally planar surfaces and a said arcuate interior jaw surface, at least two rollers being in contact with each arcuate interior jaw surface, each roller extending longitudinally beyond at least one end of the associated jaw member to provide an exposed roller portion, means for resiliently maintaining said jaw members in contact with said rollers, and roller orienting means which engage each exposed roller portion to maintain a predetermined circumferential spacing of said rollers;

said polygon having at least six sides thereby to reduce unbalanced forces transmitted from siad jaw members to said rollers.

2. The chuck of claim 1 wherein each said generally planar surface has a longitudinally extending, centrally located depression therein.

* * * * *